United States Patent [19]

Strain

[11] Patent Number: 4,585,299

[45] Date of Patent: Apr. 29, 1986

[54] PROCESS FOR FABRICATING OPTICAL WAVE-GUIDING COMPONENTS AND COMPONENTS MADE BY THE PROCESS

[75] Inventor: Robert J. Strain, San Jose, Calif.

[73] Assignee: Fairchild Semiconductor Corporation, Cupertino, Calif.

[21] Appl. No.: 515,112

[22] Filed: Jul. 19, 1983

[51] Int. Cl.$^4$ .................. G02B 6/10; H01L 21/22; H01L 31/00; B44C 1/22

[52] U.S. Cl. .................. 350/96.12; 29/572; 29/576 B; 148/1.5; 148/187; 156/653; 156/657; 156/659.1; 357/30; 357/91; 427/93

[58] Field of Search .............. 29/569 L, 572, 576 B; 148/1.5, 187; 427/93; 65/3.11; 350/96.1, 96.12; 156/653, 657, 659.1; 357/17, 30, 31, 91

[56] References Cited

U.S. PATENT DOCUMENTS 4,087,315 5/1978 Auracher et al. .............. 156/656
4,435,897 3/1984 Kuroda et al. .............. 29/572

Primary Examiner—William A. Powell
Attorney, Agent, or Firm—Burns, Doane, Swecker & Mathis

[57] ABSTRACT

Optical wave-guiding components and a process for fabricating such components in a substrate using conventional integrated circuit fabrication techniques. Ions of a suitable dopant are selectively implanted in a silicon substrate to create an interior region defining a wave-guiding region of a first index of refraction. A wave confining region surrounding the wave-guiding region is created by oxidizing the silicon substrate. The wave confining region has a index of refraction lower than that of the interior wave-guiding region defined by the implanted dopant. Various configurations of components, from which various optical component characteristics can be obtained, are disclosed. The optical components also may be combined with electronic circuit components formed on the same silicon substrate.

23 Claims, 11 Drawing Figures

PROCESS FOR FABRICATING OPTICAL WAVE-GUIDING COMPONENTS AND COMPONENTS MADE BY THE PROCESS

BACKGROUND OF THE INVENTION

The present invention relates to optical waveguides and wave-guiding components and, more particularly, to a process for fabricating optical waveguides and components in a substrate material using ion implantation and further processing of the substrate to create optical waveguide and waveguide components of controllable phase velocity. The invention also relates to various optical wave-guiding components or elements produced by this process.

The guiding structure in optical waveguide elements such as optical fibers is a region of relatively high index of refraction surrounded by a region of lower index of refraction. Because of the lowered phase velocity in the central region or core of high index of refraction, the energy density in the surrounding, lower index region decays exponentially, effectively confining all the light energy to the immediate region of the high index core. The core thus acts as a light guiding region and the surrounding region acts as a light containing or confining region, thus providing wave-guiding properties with little loss.

Such structures are used increasingly in the field of signal transmission, particularly communications, for guiding information-carrying light from one location to another. The ability to guide the light with little loss is, of course, an important aspect of optical waveguide systems. In addition, it is important to be able to perform a variety of functions on the light traversing an optical waveguide system, such as mixing, splitting, attenuating, sampling, and detecting.

The present invention provides a novel process for fabricating optical wave-guiding components in a substrate, particularly a silicon substrate. Using the present techniques, a variety of optical wave-guiding components such as waveguides, directional couplers, attenuators, detectors and terminations can be readily fabricated. As will be seen hereinafter, the use of ion implantation and other known integrated circuit fabrication techniques permits the creation of optical waveguide of controllable phase velocity which can be configured to provide this wide variety of optical components.

OBJECTS AND BRIEF SUMMARY OF THE INVENTION

It is an object of the present invention to provide a novel fabrication technique for producing optical wave-guiding components in a substrate material through the use of selective ion implantation and further known integrated circuit fabrication techniques.

It is a further object of the present invention to provide a novel fabrication technique for producing optical wave-guiding components in a silicon substrate using known integrated circuit fabrication techniques to produce an interior or core region of higher index of refraction than a region of the substrate surrounding the core region.

It is still another, more specific object of the present invention to provide a novel optical waveguide and a fabrication process for producing optical waveguide and other optical elements in a silicon substrate by implanting a dopant in the substrate and oxidizing at least the portion of the substrate surrounding the implanted dopant, whereby conventional integrated circuit fabrication techniques can be used to produce a variety of optical components particularly suited for interfacing optical and electronic systems.

It is yet a further object of the present invention to provide novel optical wave-guiding components with desired phase velocity characteristics and in an variety of useful configurations.

It is still a further object of the present invention to provide a novel optical wave-guiding structure in a silicon substrate.

In accordance with the invention, ions of a suitable dopant are implanted into a substrate to create a interior region of the substrate which has an index of refraction exceeding that of the substrate. The substrate is further processed to produce a region surrounding the interior region of ion implant in order to produce a surrounding, confining region of lower index of refraction than the interior, ion implant region. The further processing also reduces optical imperfections caused by ion implantation.

In a preferred embodiment of the invention, the substrate is silicon and silicon dioxide forms the surrounding medium of lower index of refraction. Silicon dioxide has an index of refraction of approximately 1.4, so a doped core or interior region having an index of refraction only 2% higher than the surrounding silicon dioxide will effectively confine the light energy within a region approximately 1 micron from the core.

A variety of dopants, added to the substrate by ion implantation as a few atomic percent of the silicon concentration will increase the index of refraction to the desired extent. For example, boron, phosphorous, arsenic and germanium may be incorporated into the silicon substrate to provide the interior or core region of relatively higher index of refraction.

In the preferred form of the invention, the dopant is incorporated into the silicon substrate by conventional ion implantation techniques. The silicon substrate is masked in a suitable conventional manner to form a pattern with an opening through which the dopant ions can be selectively introduced. A larger opening is then formed by suitable masking techniques with the doped region of the substrate approximately centered in this larger opening. The masking material selected for producing this larger opening is preferably impervious to common silicon oxidizers so that the exposed silicon substrate can be oxidized selectively to produce an oxide layer surrounding the implanted dopant.

In this regard, the silicon substrate may be oxidized to form a thin oxide layer over its surface and a thin silicon nitride layer may be deposited over the oxide layer using techniques common to the localized oxidation fabrication process for integrated circuits. Using a first mask, an opening is defined in the silicon nitride, leaving the silicon dioxide in place. This opening will define the extent of the light confining region of the component so it has the approximate, desired dimensions of the area of low index of refraction. Using a second mask, an opening is defined and etched in the silicon dioxide layer. This opening has the approximate, desired dimensions of the interior or core region of high index of refraction which will ultimately form the wave-guiding region.

Using ion implantation, a selected dopant such as arsenic, boron, germanium or phosphorous is implanted relatively deeply (e.g. one micron) into the underlying silicon through the opening in the oxide layer. A dopant such as boron may be preferable since it has a segregation coefficient favoring incorporation into silicon dioxide which is ultimately used as the light confining element of the component. Phosphorous and arsenic, because of their very different segregation properties, might have a tendency to accumulate ahead of a growing interface of silicon dioxide.

The oxide layer is then removed to the edge defined by the silicon nitride layer and the silicon substrate is oxidized through this larger opening. Because the nitride is impermeable to oxygen and water vapor, two common silicon oxidizers, oxide grows almost exclusively in the open region defined by the opening in the silicon nitride layer. As the oxide grows, it consumes the substrate silicon and, when the growing interface reaches the dopant, it is also consumed and becomes incorporated in the silica in a localized region. The oxide growth is continued to a thickness of about 2 microns so that it totally surrounds the interior doped region. In this connection, it may be advantageous to carry out the oxidation process at an elevated pressure to ensure better localization of the dopant and it may be desirable to use a dry oxidation process to avoid optical losses associated with water in the lattice.

The resultant product is an optical wave-guiding component formed in the silcon substrate with an interior, guiding region or core produced by the implanted dopant and a surrounding, containing region produced by the grown silicon dioxide. The interior region or core has an index refraction sufficiently greater than the surrounding oxide region to satisfy the requirements of an optical waveguide, i.e. all the energy is essentially confined to the immediate region of the high index core.

BRIEF DESCRIPTION OF THE DRAWINGS

The foregoing and other objects and advantages of the present invention will be appreciated by one skilled in the art to which the invention pertains from the following detailed description when read in conjunction with the appended drawings in which.

DETAILED DESCRIPTION

Figure 1A:
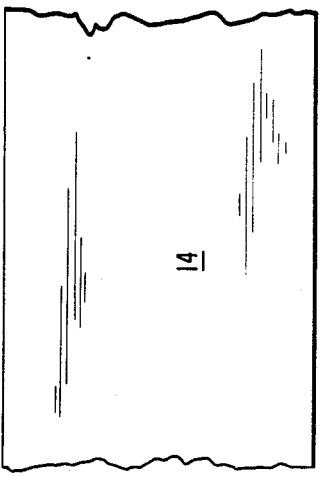
FIGS. 1A–1E are schematic diagrams illustrating a preferred embodiment of the fabrication technique in accordance with the present invention.
Figure 1A:
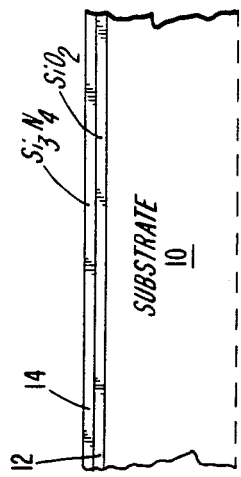

A preferred embodiment of a fabrication technique for producing optical wave-guiding components in accordance with the present invention is illustrated at various stages of the process in FIGS. 1A–1E. Referring now to FIG. 1A, a silicon substrate, 10 such as a silicon wafer or chip used in the manufacturer of integrated circuits is oxidized to create a silicon dioxide layer 12 on a surface thereof. A second layer of silicon nitride 14 is deposited on the silicon dioxide layer. The formation of the oxide and nitride layers is accomplished using techniques common to the localized oxidation fabrication process.

Figure 1B:
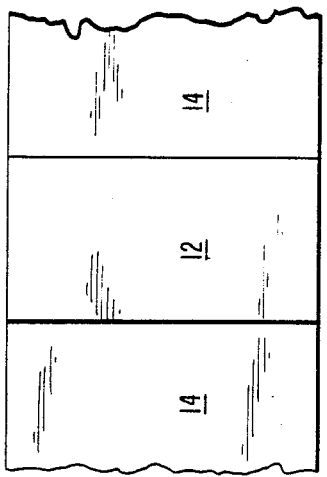
Figure 1B:
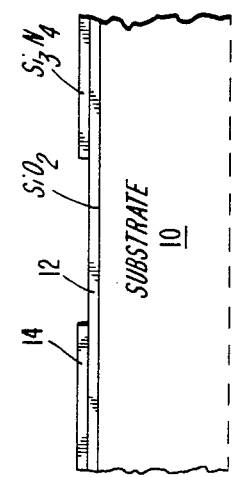

An opening is produced in a suitable conventional manner through the silicon nitride layer 14, leaving the silicon dioxide layer 12 in place as is shown in FIG. 1B. This opening defines the desired extent of the light confining region of lower index of refraction in the finished component as will be seen hereinafter.

Figure 1C:
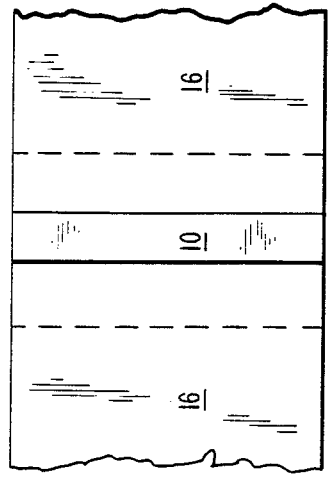
Figure 1C:
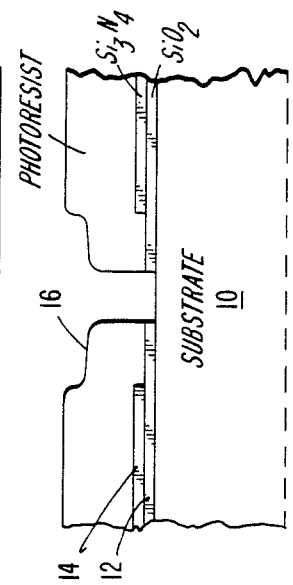

As is illustrated in FIG. 1C, an opening is produced in the silicon dioxide layer 12 using conventional techniques. For example, a photoresist 16 may be deposited over the entire upper surface of the structure and then selectively exposed to light through an optical mask to produce an opening through which the opening in the silicon dioxide layer 12 may be etched. The photoresist 16 used to define the opening in the silicon dioxide layer may be left in place for the subsequent ion implantation step, a practice commonly followed in integrated circuit fabrication.

The opening in the oxide layer 12 defines the approximate extent of an interior region of the substrate which will be doped through conventional ion implantation techniques. This interior region, as will be seen hereinafter, will form the guiding region or core of the optical wave guide component. In order to produce this guiding region, ions are implanted into the substrate 10 though the opening in the photoresist and silicon dioxide layer illustrated in FIG. 1C. Ions of a selected dopant such as arsenic, boron, germanium or phosphorous are implanted relatively deeply into the underlying silicon (e.g., one micron) using suitable energy levels. The vertical extent of the dopant is determined by the implant energy through well known stopping statistics.

Figure 1D:
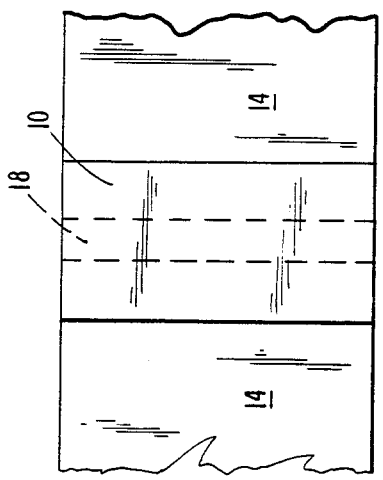
Figure 1D:
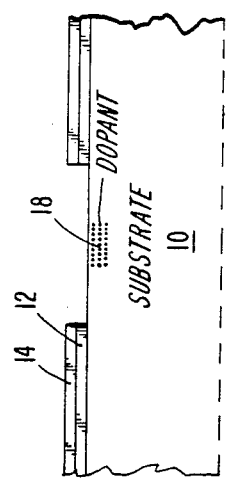

As illustrated in FIG. 1D, the photoresist 16 is removed and the oxide layer 12 is also removed back to the opening defined by the silicon nitride layer 14. The interior region 18 defined by the implanted dopant is approximately centered in the opening in the silicon nitride layer.

Figure 1E:
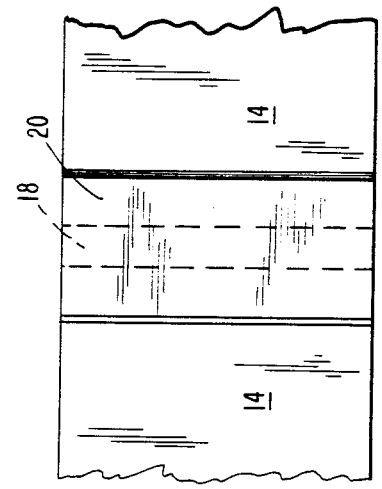
Figure 1E:
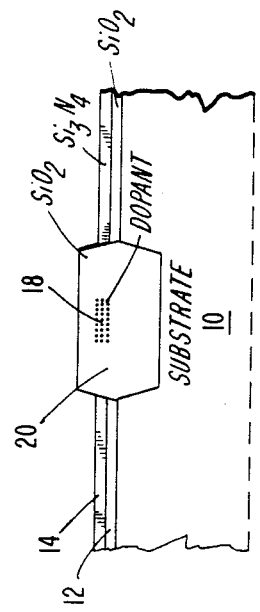

The substrate 10 is then subjected to oxidation through the opening in the nitride and oxide layers by a suitable oxidation technique. Because the silicon nitride is impermeable to oxygen and water vapor, two common silicon oxidizers, the substrate oxidizes almost exclusively in the open region. As the oxide grows, it consumes the substrate silicon and, when the growing oxide interface reaches the dopant, it is also consumed and becomes incorporated in the silica (i.e. the grown silicon dioxide) in a localized region as illustrated in FIG. 1E. The oxide growth 20 (FIG. 1E) is allowed to proceed to a depth sufficient to produce a region of oxidized substrate completely surrounding the implanted dopant, e.g. to a depth of about 2 microns. It may be advantageous to carry out the oxidizing process at an elevated pressure to insure better localization of the dopant.

FIG. 1E illustrates a completed optical wave-guiding component, e.g. a straight optical waveguide, made in accordance with the above-described process. The dopant 18 is approximately centered in the thick grown oxide and defines an interior region or core for guiding light, surrounded by the silicon dioxide light confining region 20 of lower index of refraction.

It will be appreciated that the foregoing structure described in connection with FIGS. 1A-1E is for illustrative purposes only. The complete process in its preferred form is illustrated and described, but the resulting structure shown in FIG. 1E is incomplete in that such a waveguide structure will typically start at a light source and end at some utilization device or further wave-guiding element.

Figure 2A:
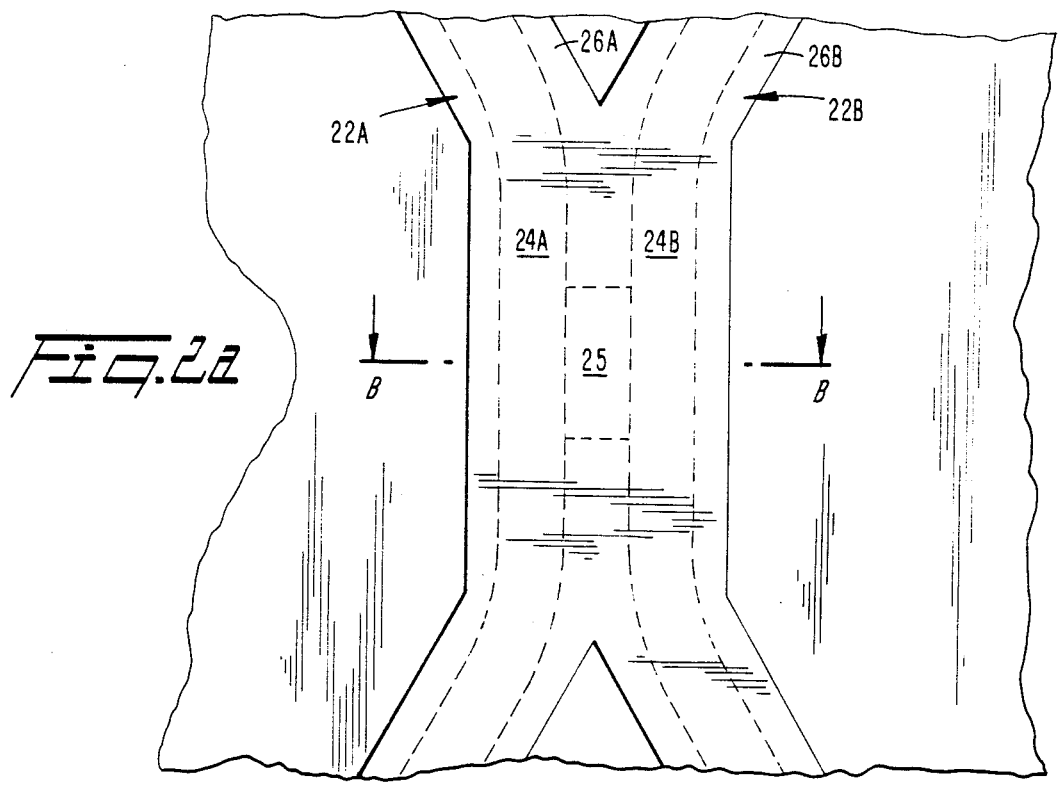
FIG. 2A is a plan view of an optical wave-guiding component, in particular on optical coupler, produced in accordance with the fabrication technique of the present invention.
Figure 2B:
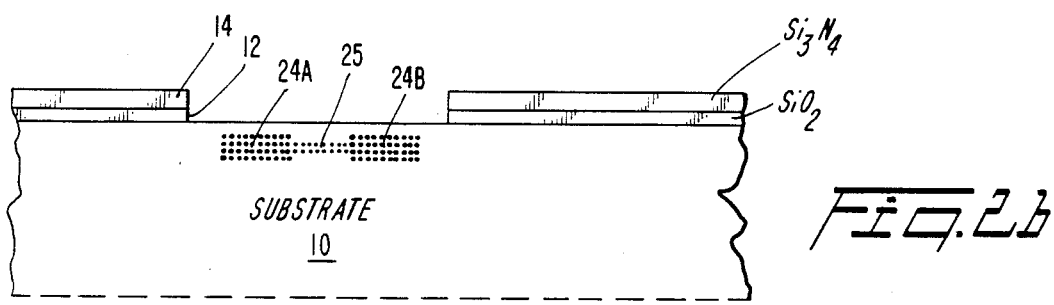
FIG. 2B is a view in cross section of the component of FIG. 2A before subjecting the component to oxidation.
Figure 2C:
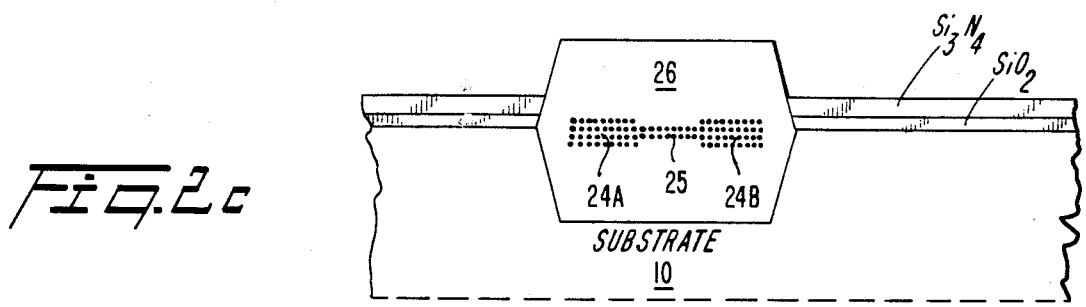
FIG. 2C is a view in cross section of the component of FIG. 2A after subjecting the component to oxidation.

FIGS. 2A-2C illustrate a portion of an optical waveguiding component fabricated in accordance with the process of the present invention. That portion of the component illustrated in FIGS. 2A-2C is a directional coupler wherein weak coupling is provided between two optical waveguides.

Referring to FIG. 2A, the directional coupler comprises two optical waveguides 22A and 22B each including an interior region or core 24A and 24B, respectively. An interior coupling region 25 extends between the light guiding cores 24A and 24B to provide optical coupling between them. Surrounding the light guiding cores and coupling region 25 is a light containing region 26A, 26B of lower index of refraction than the core. The interior guiding and coupling regions and surrounding light containing regions are produced, respectively, by ion implantation and oxidizing techniques as previously described.

FIG. 2B illustrates the component of FIG. 2B in cross-section along the line B—B. In FIG. 2B, the component is illustrated just before the oxidation stage of the process. A suitable dopant defines the interior, light guiding cores 24A and 24B and the interior coupling region 25. As illustrated, the ion implantation process is controlled so that the coupling region 25 extends from one core 24A to the other core 24B providing a light guiding path therebetween. The longitudinal and vertical extents and/or the doping density of the coupling region are controlled to provide a desired amount of optical coupling between the cores.

FIG. 2C illustrates the completed coupling section of the optical coupler of FIG. 2A along the line B—B after growth of the oxide, light confining region 26 around the interior light guiding regions. A portion of the light guided along the optical waveguide 24A is coupled through the coupling element 25 to the optical waveguide 24B and vice-versa. In the illustrated embodiment, the concentration of the dopant forming the interior coupling region is less than that of the cores to provide relatively weak coupling. This degree of coupling can be readily controlled with extreme precision because of the precision of the processing techniques involved. In particular, present implantation techniques provide precision on the order of 2% which assures excellent performance within any fabrication lot and excellent reproducibility from lot to lot related, of course, to the ability of contemporary integrated circuit fabrication equipment to repeat temperatures, times and gas flows.

Figure 3:
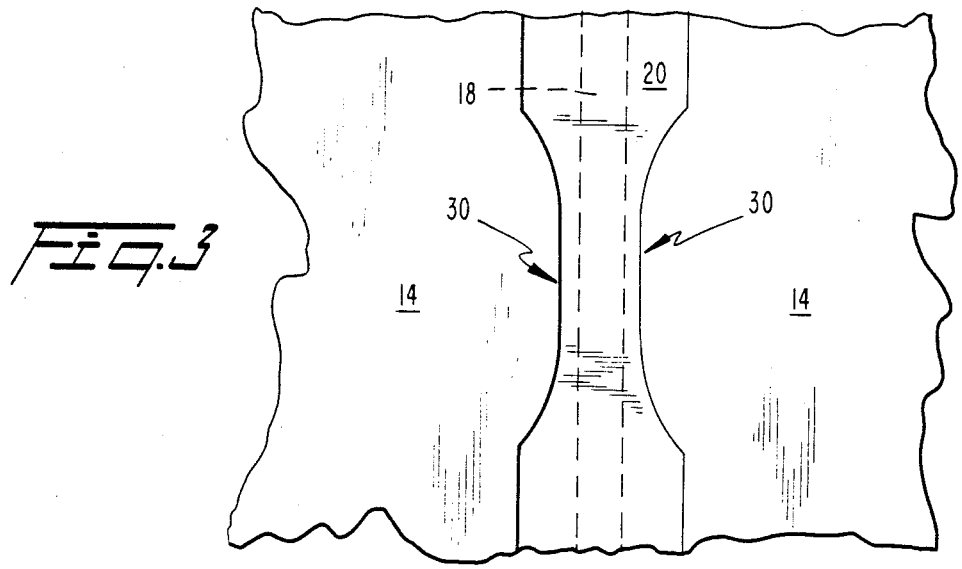
FIG. 3 is a plan view of another optical wave-guiding component having attenuating properties and fabricated in accordance with the present invention.

FIG. 3 illustrates an optical attenuator fabricated in accordance with the disclosed technique. The only difference between the component of FIG. 3 and that of FIG. 1E is the shape of the light confining region. Accordingly, like numerical designations have been used to indicate like elements of the structure.

As can be readily seen from FIG. 3, the light guiding core 18 produced by ion implantation is of uniform width whereas the confining, oxide region 20 gradually decreases and then increases in width along its length as is generally indicated at 30. Because the substrate silicon is highly absorbing to the wavelengths of light commonly used in optical fiber systems, e.g. wavelengths of 1.15 microns or less, an attenuation of the light travelling in the guiding region 18 results from bringing the sidewalls of the confining region 20, and thus the silicon substrate, closer to the guiding region in a gradual, tapered manner as illustrated at 30.

Figure 4:
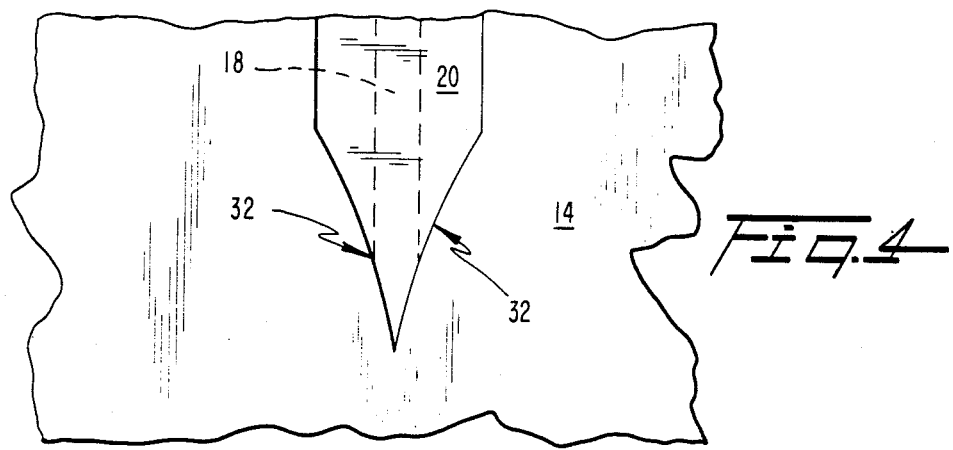
FIG. 4 is a plan view of an optical waveguide terminator fabricated in accordance with the present invention; and, FIG. 5 is a plan view of an optical wave-guiding component and electronic circuit component formed on the same substrate in cooperative relationship.

The principles involved in the attenuator of FIG. 3 can be extended to the production of a termination as illustrated in FIG. 4. The sidewalls of the light confining region 20 and the light guiding region itself may be tapered as is generally indicated at 32 in FIG. 4, in order to gradually guide the light waves into the silicon substrate. The light is absorbed by exciting the electron-hole pairs in the silicon much as with the attenuator of FIG. 3, but the absorption is complete rather than partial.

Figure 5:
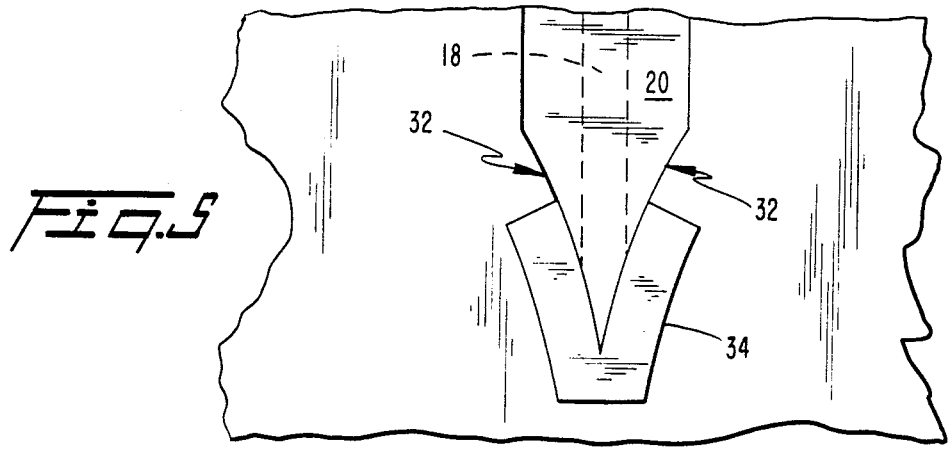

The same principle may be used to form an extremely efficient detector element in conjunction with a waveguiding component in order to provide detection of the light waves guided by the component. Referring to FIG. 5, the structure of the termination of FIG. 4 is used to guide the light waves into the silicon substrate wherein one or more diodes or other suitable detector elements are formed by conventional semiconductor fabrication techniques. For example, a p-type region may be diffused into an n-type substrate, or vice-versa, to produce a diode region or regions generally indicated at 34. The tapered region 32 extends into the diode region 34 so that the light energy is guided into the diode region and is detected. Similar structures may be incorporated into integrated circuits to provide amplification, etc.

It will be appreciated that a wide variety of optical components may be fabricated in accordance with the principles of the present invention. Various optical elements can be integrated in a common substrate and various electronic integrated circuit elements may be fabricated on the same substrate to produce complex system configurations with a relatively simple and straightforward approach. Using known integrated circuit fabrication techniques, a highly precise, reproducible line of components and systems can be produced.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A process for producing an optical wave-guiding component in a substrate comprising the steps of:
    selectively implanting ions of a dopant into the substrate to create an interior region of the substrate having a first index of refraction; and,
    processing the substrate to modify at least the portion of the substrate surrounding the interior region thereof in order to reduce any optical imperfections caused by implanting ions and to insure an index of refraction in said surrounding portion less than said first index of refraction.

2. The process of claim 1 wherein the extent of the interior region created by implanting ions defines the extent of the wave-guiding region of the optical component.

3. The process of claim 2 wherein the extent of the interior region is determined by masking the substrate to produce a pattern with a opening defining the approximate desired extent of the interior region, and implanting ions in said substrate exposed through said opening.

4. The process of claim 2 wherein the extent of the interior region is defined by:
producing a layer on the substrate;
removing a portion of the layer to define an opening in the layer corresponding approximately to the desired extent of the interior region; and
implanting ions in the substrate through said opening.

5. The process of claim 1 wherein said substrate is silicon and said ions are taken from the group consisting of Arsenic, Boron, Germanium and Phosphorous.

6. The process of claim 1 wherein said substrate is silicon and the step of processing the substrate comprises the step of oxidizing the silicon substrate at least in a region surrounding and including the interior region of implanted ions.

7. The process of claim 3 wherein said substrate is silicon and the step of processing comprises the step of oxidizing the silicon substrate exposed through said opening to a depth below said interior region of implanted ions.

8. The process of claim 4 wherein said substrate is silicon and said layer produced on the silicon substrate is a silicon nitride layer and wherein said portion of the layer is removed by photoetching.

9. A process for fabricating an optical wave-guiding component in a silicon substrate comprising:
selectively implanting ions of a dopant into an interior region of the substrate to create a region in the interior of the substrate defining the desired extent of a light wave guiding region in the substrate; and,
modifying at least a portion of the substrate surrounding the implanted dopant to create a light wave confining region surrounding the light wave guiding region, the modified portion of the substrate having a lower index of refraction than the interior containing the dopant.

10. The process of claim 9 wherein the modifying step comprises oxidizing the silicon surrounding the dopant including the silicon in which the dopant is implanted.

11. The process of claim 9 wherein the implanting and modifying steps are effected using conventional integrated circuit fabrication techniques including ion implantation, chemical vapor deposition, photolithography etching and oxidation.

12. The process of claim 9 wherein the dopant is boron.

13. The process of claim 9 wherein the dopant is taken from the group consisting of boron, phosphorous, arsenic and germanium.

14. A process for fabricating an optical wave-guiding component in a silicon substrate comprising the steps of:
producing a silicon nitride layer overlying a surface of the substrate;
defining an opening in the silicon nitride layer corresponding approximately to the desired extent of a confining region of a first index of refraction;
implanting in the silicon substrate, in a localized area within the opening in the nitride layer, a dopant which alters the optical characteristics of the silicon substrate so as to produce an implanted guiding region of a second index of refraction higher than the first index of refraction;
oxidizing the silicon substrate through the opening in the silicon nitride layer to the extent necessary to provide grown silicon dioxide completely surrounding and including the region of the implanted dopant, the grown silicon dioxide having said first index of refraction and defining said confining region.

15. The process of claim 14 including the steps of:
producing an oxide layer on the surface of the substrate;
depositing the nitride layer on the oxide layer;
removing a portion of the nitride layer from the oxide layer so as to define said opening;
removing a portion of the oxide layer from the silicon substrate within the confines of said opening in the nitride layer so as to define an opening in the oxide layer corresponding approximately to the desired extent of said guiding region of said second index of refraction; and
implanting said dopant through the opening in said oxide layer.

16. An optical wave-guiding component comprising a silicon substrate, and an oxidized region of the substrate surrounding an interior region of a higher index of refraction than said oxidized region, said interior region containing selectively implanted ions of a dopant defining an optical wave-guiding region and said oxidized region defining a light confining region surrounding said interior, guiding region.

17. An optical wave-guiding component according to claim 16 wherein the dopant is taken from the group consisting of boron, phosphorous, arsenic and germanium.

18. An optical wave-guiding component according to claim 16 wherein the dopant is boron.

19. An optical wave-guiding component according to claim 16 wherein said component is an optical coupler, said component including at least two separately interior wave-guiding regions coupled by a coupling region containing selectively implanted ions of a dopant and extending between said two wave-guiding regions.

20. An optical wave-guiding component according to claim 16 wherein said component includes a tapered portion of at least said oxidized region wherein, in said tapered portion, the silicon substrate is closer to the wave-guiding region than in non-tapered portions of the oxided region.

21. An optical wave-guiding component according to claim 20 wherein the tapered portion includes both the oxidized region and the interior region.

22. An optical wave-guiding component according to claim 16 including electronic circuit component formed on the silicon substrate in cooperative relationship to the optical wave-guiding component.

23. An optical wave-guiding component according to claim 22 wherein said electronic circuit component is a diode formed by diffusing a dopant into the silicon substrate, the diode communicating with the optical wave-guiding component to detect light waves guided by said component.

* * * * *